US008385163B2

(12) United States Patent
Goyal et al.

(10) Patent No.: US 8,385,163 B2
(45) Date of Patent: Feb. 26, 2013

(54) OPTICAL DISC LIBRARY SYSTEM AND METHODS

(75) Inventors: Ravender Goyal, Saratoga, CA (US); Kyquang Son, Dublin, CA (US); Amir H. Torkaman, Sunnyvale, CA (US); Jamie Nam, Sunnyvale, CA (US); Kimhoe Pang, San Jose, CA (US); Richard Sharpe, Mountain View, CA (US)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/683,216

(22) Filed: Jan. 6, 2010

(65) Prior Publication Data

US 2012/0117578 A1 May 10, 2012

Related U.S. Application Data

(60) Provisional application No. 61/142,814, filed on Jan. 6, 2009.

(51) Int. Cl.
*G11B 7/24* (2006.01)

(52) U.S. Cl. .................................... 369/30.03
(58) Field of Classification Search .................. None
See application file for complete search history.

(56) References Cited

U.S. PATENT DOCUMENTS

| | | | | |
|---|---|---|---|---|
| 2003/0011925 | A1* | 1/2003 | Gariepy et al. | 360/92 |
| 2005/0007896 | A1* | 1/2005 | Haas | 369/30.6 |
| 2006/0005209 | A1* | 1/2006 | Chiang et al. | 720/600 |
| 2007/0035874 | A1* | 2/2007 | Wendel et al. | 360/97.02 |
| 2007/0201164 | A1* | 8/2007 | Bauck et al. | 360/98.04 |
| 2009/0025021 | A1* | 1/2009 | Iguchi et al. | 720/674 |
| 2009/0262445 | A1* | 10/2009 | Noble et al. | 360/31 |

* cited by examiner

*Primary Examiner* — Joseph Haley
*Assistant Examiner* — Henok Heyi
(74) *Attorney, Agent, or Firm* — Antonelli, Terry, Stout & Kraus, LLP.

(57) ABSTRACT

A system for optical disc storage, writing and reading including a housing holding at least two optical disc racks and a plurality of read/write drives that may be positioned in line with the storage rack. A track spans the racks, (e.g., a parallel track is positioned between two racks). A shuttle mounted on the track allows transfer of discs from the racks to drives. The shuttle may allow for disc pass through, disc rotation, or have other structures for disc transport.

19 Claims, 6 Drawing Sheets

OPTICAL DISC LIBRARY SYSTEM AND METHODS

CROSS-REFERENCE TO RELATED APPLICATION

This application claims priority from U.S. provisional application No. 61/142,814, filed Jan. 6, 2009.

TECHNICAL FIELD

The present invention relates to data read/write and management systems, components and methods and more specifically to optical library systems, components, and methods.

BACKGROUND

Optical discs, such as digital video discs (DVDs) and compact discs (CDs) provide a convenient and low cost means for data storage.

Optical discs are sometimes referred to as WORM (write once, read many) storage discs. This refers to the property of these storage devices (and their associated media) allowing data to be written once, and then be physically incapable of being re-written. WORM is especially useful for archival storage and data backup. Because WORM media cannot be written over, the media can not be erased (either inadvertently or deliberately) and the data would be more secure. Such security lends itself to reliable archive of data, as might be required in legal fields, historical archiving, and medical data storage. Data destruction requires destruction of the media, which would be apparent to observers. In addition, security features can be added to the system allowing for greater data security. For example, a universal identification number can be associated with each disc or data block. Alternatively, another identification number, bar code, checksum or other identifier could be associated with an optical media device, allowing detection of disc removal and replacement. Further, the recorded data can be protected, for example by encryption. With such solutions, archival data can be made quite secure.

Data centers have a need for processing large amounts of data. Such data would need to be stored in a secure manner. Optical discs provide one method of secure storage of a large amount of data. A single layer digital video disc can store 5 GB of data on a standard 12 cm disc. Higher density formats, such as Blu-ray, allow storage of up to 50 GB of data on a single storage disc. This massive storage capacity can be leveraged by an automated library system that would allow parallel read/write operations, and robotic disc handling to allow maximized throughput of the desired processes.

SUMMARY

In one embodiment of the present invention, a system for data storage includes a housing containing at least two optical disc storage racks. Between the two storage racks is a track onto which a shuttle is mounted. In line with the storage racks (e.g., at the end of the storage racks) is a plurality of read/write drives. A power unit is located below the drives to allow for a more compact dimension of the system. The shuttle allows transport of optical discs stored on the storage racks to be transported to the read/write drives. In one embodiment, the shuttle is configured to allow transport of multiple discs in a single transport operation. A first disc is loaded onto the shuttle, followed by a second disc. The two discs are then moved to the location of the read/write drives, where the two discs are each unloaded into a drive for data reading or writing.

The racks for the disc may hold storage cartridges in which the discs are contained. The track may be located between the two racks, such that the racks and the track are all substantially parallel. In other embodiments, the shuttle may be a converted read/write drive. This allows an off the shelf solution for disc transport, with associated low cost, ease of replacement, and operating standards. The shuttle may have a solenoid controlled actuator which triggers a mechanism on the disc storage racks that expels the disc from the rack. The drive mechanism for the shuttle may be a ball screw mechanism.

In another alternative embodiment, the system may include a shuttle allowing discs to "pass through", that is to be accepted on either side of the shuttle. This provides the advantage of allowing discs to be loaded onto the shuttle from either side and taken off of the shuttle from either side, without the need to rotate the shuttle.

The configuration of the track could include a "Cartesian type" configuration in which the track includes a first track fixedly mounted to the housing, and a second track which can slide to a defined position on the first track. Mounted on the second track is a shuttle that can grip and transport the disc, and rotate to grasp discs from racks or drives positioned against walls of the housing.

DETAILED DESCRIPTION

In the various exemplary embodiments, systems for storage of optical discs, and parallel read/write and disc transferred are illustrated. Embodiments of various components of these systems are also illustrated.

Figure 1:
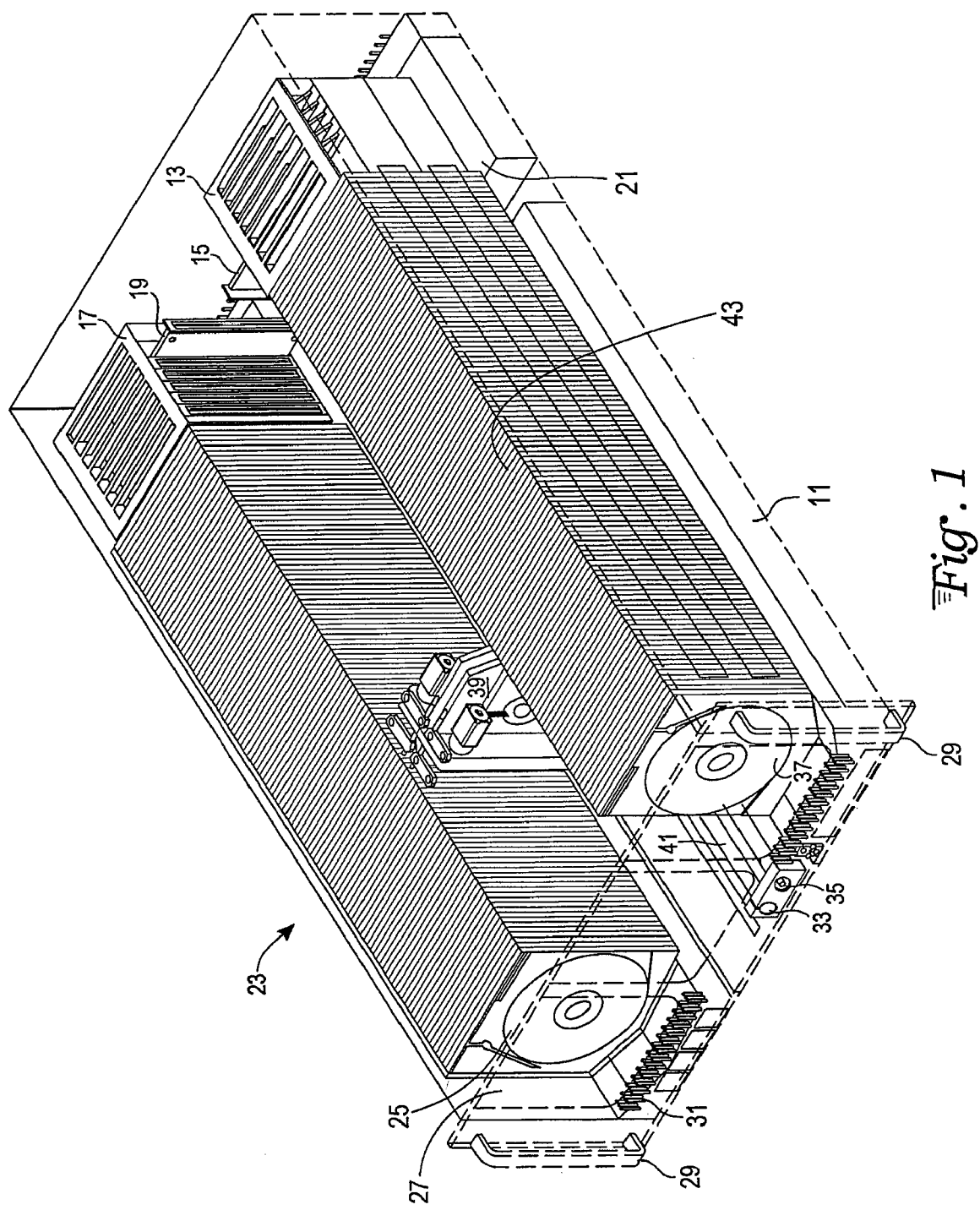
FIG. 1 is a top perspective view of an embodiment of an optical disc library system.

With reference to FIG. 1 the illustrated view shows a housing 11 containing the components of the system. In all of the views, the top of the housing is not shown, allowing viewing of the internal components. It is expected that the housing will include a removal top, to allow access to the internal components, for example to add or replace optical discs, read/write drives or power sources.

The housing 11 includes a first and a second side, a front including windows 27, 41 allowing viewing of internal components and a back. Contained within housing 11 is a first optical disk bank 23 and a second optical disk bank 43 positioned along a length of the first and second side within housing 11. Each of the optical disk banks is comprised of a library of optical disks.

Exemplary on optical disk 25 is shown in an individual disk cassette having a disc ejection mechanism. A number of alternative devices including book-type holders for holding multiple optical disks may be used. Such devices are selected to allow a greater density of disks to be stored and read within the present system.

A shuttle 39 is configured to transfer the optical disks from optical bank 23, 43 and transport them to optical read/write drives which are part of optical read/write drive bank 13, 17. An optical read/write drive 15, 19 is shown being removed. These drives are individually replaceable. Below optical read/write drive bank 13 is power source 21. Power source 21 provides power for all of the read/write drives in the bank of optical read/write drives.

An optical disk such as optical disk 25 in optical disk bank 23 may be moved from the optical disk bank 23 by shuttle 39 and taken to the optical read/write drive bank 17 where the optical disk is transferred into an optical read/write drive. The disk may then be read or information may be written onto the disk. When the data has been read from the disk or written onto the disk the disk may be again transferred onto shuttle 39 and returned to its original location in disk bank 23. Alternatively, the disk may be transported by shuttle 39 to a new location. In one example, blank disks may be positioned at a location within the disk bank, such as the front end of the disc bank. Once data has been written onto a blank disc, the disc would then be transferred to a selected location in the bank of discs.

Shuttle 39 is mounted on track 41 attached to housing 11 by mounting plate 33. A rod 35 may be fixedly attached to mounting plate 33 and housing 11. Track 41 may run the length of the housing. A gap between the end of optical disk bank 43 and window 37 provides a sufficient area for the mounting plate attachment to the housing. In addition, the shuttle 39 includes a disc ejection mechanism which requires a clearance space at the end of rows.

In the illustrated embodiment of FIG. 1, the bank of discs is shown as having the bank of discs in the front of the housing along each side of the housing, and the read/write drives at the back of the housing. The placement of the read/write drives is exemplary, and the read write drives could be at the front, in the middle, or in multiple locations (e.g., front and back) along one or each side of the housing. As long as the discs and read/write drives are in line and separated by a track along which the shuttle can travel, any configuration is possible. In the illustrated configuration, the single power source is located under the drives. This has been found to allow a compact housing dimension, which is advantageous in some embodiments.

The use of banks of three or more drives at one time allows for a number of operations to be performed at one time. This is important for a number of operations, including multidisc parity operations in which the data on multiple discs is read and parity data recorded onto a separate parity disc. In addition, the illustrated shuttle allows for multiple discs to be transferred in each transfer operation. This also enhances efficiency.

Attached to housing 11 are carrying handles 29. A vent 31 allows heat to be removed from within the housing.

Figure 2:
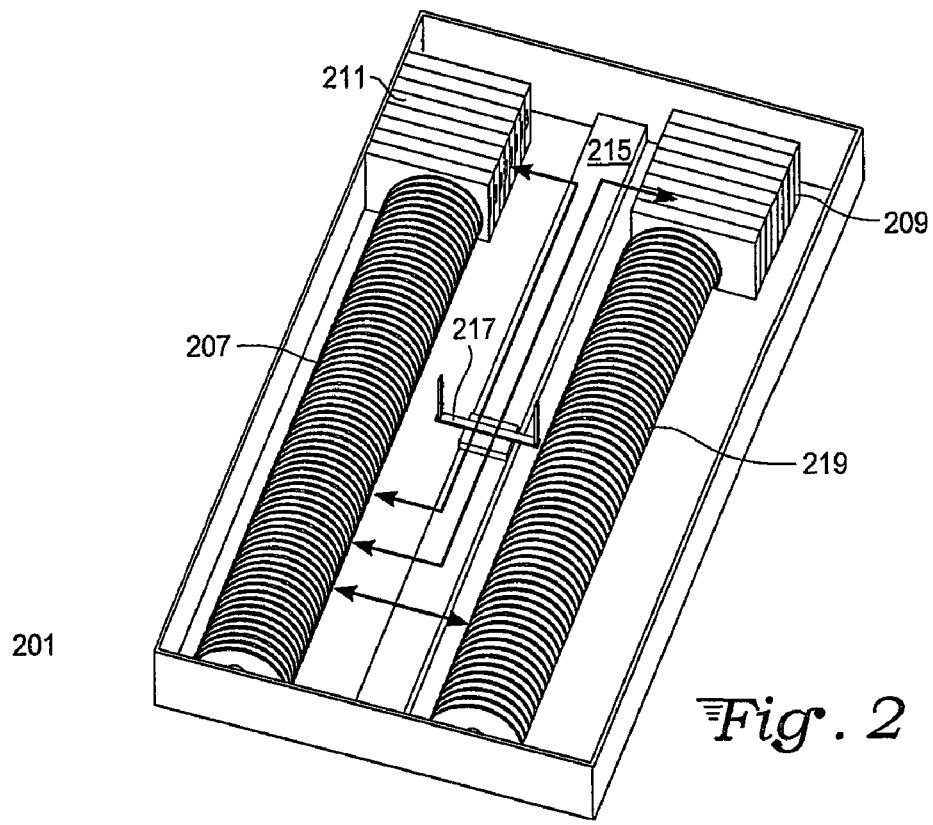
FIG. 2 is a top view of an alternative embodiment of an optical disc library system.

The movement of the disks is illustrated in FIG. 2. As shown in FIG. 2, contained within the housing 201 are first optical disk bank 207 and second optical disk bank 219. Optical disks from these banks may be transferred via roller shuttle 217 mounted on track 215. The disks are moved from the disc banks to read/write drive banks 211, 209. The grip rollers on the shuttle allow a disk pass-through configuration in which disks may be loaded from either side of the shuttle and unloaded either side of the shuttle. The configuration allows a disk to be easily transferred from a first disk bank 207 to a second disk bank 219.

Figure 3:
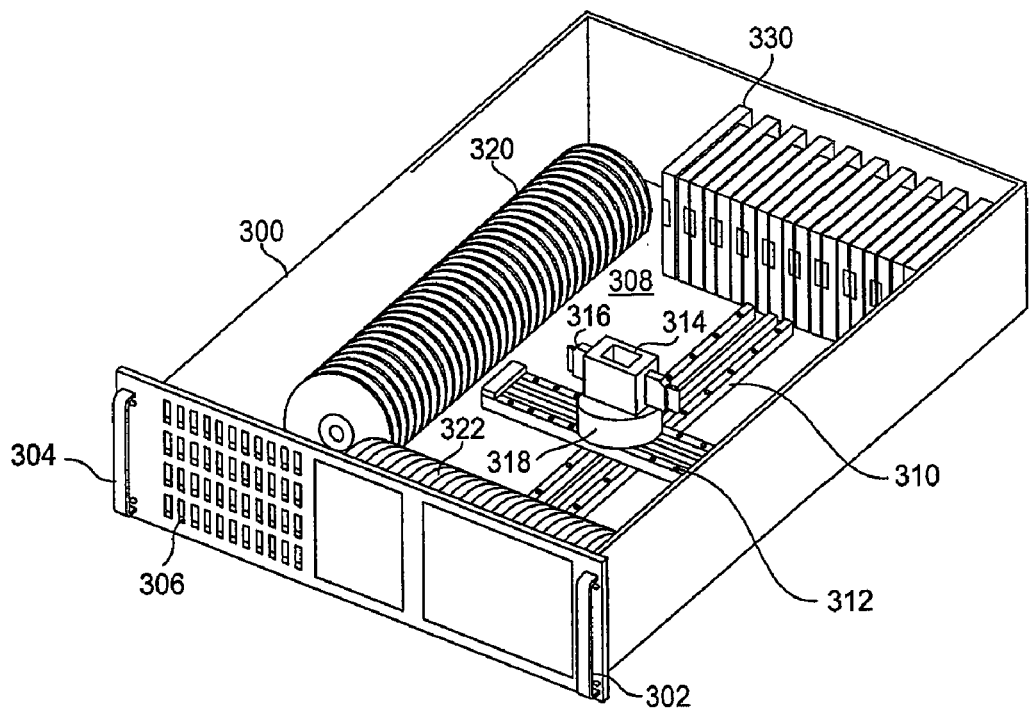
FIG. 3 is a top perspective view of another alternative embodiment of an optical disc library system having a Cartesian track configuration.

With reference to FIG. 3, a Cartesian x-y embodiment of the optical disk library is illustrated. As in the other embodiments, a housing 300 having handles 302, 304 and vents 306 house the internal components. As in the previous embodiments, on two or more of the sides of the housing are optical disk banks 320, 322. Mounted on the floor of the housing is y track 310. Mounted on top of y track 310 is orthogonal x track 312. Y track 310 is mounted on housing floor 308. Mounted on x track 312 is shuttle 314 which includes gripper arms 316 mounted on a rotating shuttle base 318.

The x track 312 is mounted on y track 310 such that it can be controllably positioned along the length of the y track. The shuttle is mounted on the x track such that it can be controllably positioned along the length of the x track. When the shuttle 314 is positioned at the end of x track 312 closest to optical disc bank 320, the gripper 316 on shuttle 314 can selectively grip an optical disc. The disc can then be moved by sliding shuttle 314 on x track 312 and rotating shuttle 314 by rotating shuttle base 318 90 degrees while also moving (e.g., simultaneously moving) the x-track 312 on y track 310 such that the disc is positioned such that it may be inserted into a read/write drive in the bank of read/write drives 330.

In this embodiment, the optical disc banks are shown on two of the four sides within the housing. It should be understood that the discs could be against more than two of the sides, to allow maximization of the discs available for use in the system.

Figure 4:
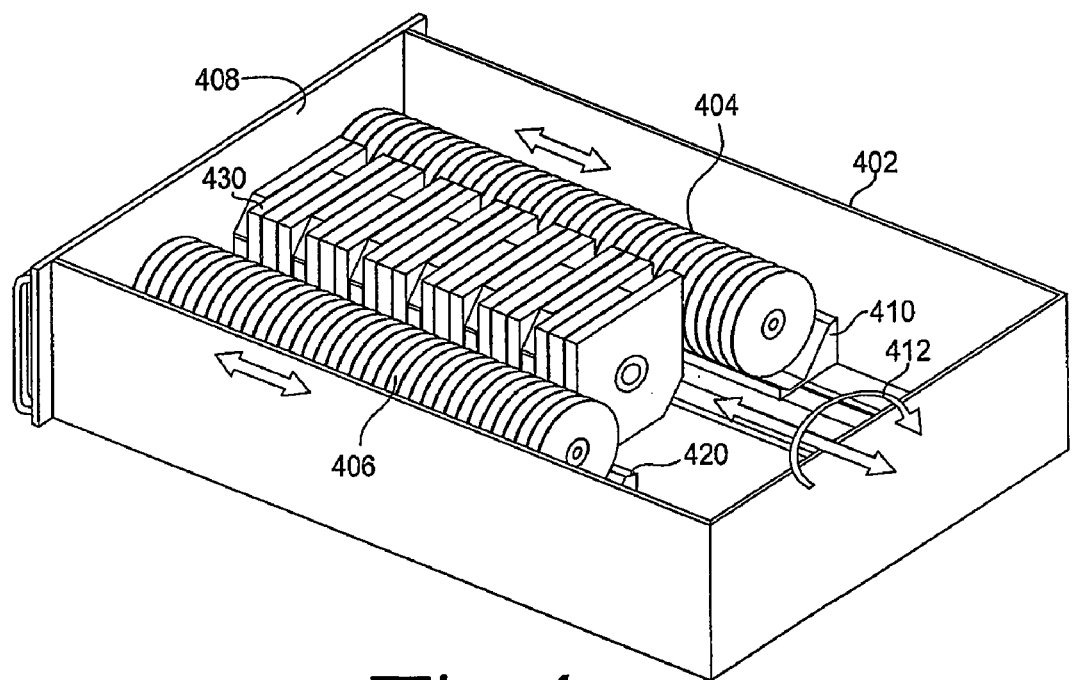
FIG. 4 is a top perspective view of another alternative embodiment of an optical disc library system having mobile racks and a central bank of read/write drives.

With reference to FIG. 4, another embodiment of the optical disk library system is shown. In this library system the housing 402 includes vents 408. The racks of optical disks 404, 406 are mounted on sleds 410, 420 which are mounted on tracks such as track 412 onto which sled 410 is mounted. This allows the disks to be moved relative to optical drives in bank of read/write drives 430. The sleds could include disc eject mechanisms which would allow the discs to be moved directly from the racks into the read/write drives without use of a shuttle. In this configuration the racks of optical discs act as the shuttle, moving the discs relative to the optical drives. Although some space is lost due to the need to move the racks of optical discs, some space is recovered because shuttle track is no longer required. The read/write drives in this configuration face in alternating directions (i.e. every other drive has a reversed orientation such that about half of the drives are positioned to receive discs from each of the racks of optical discs.

Figure 5:
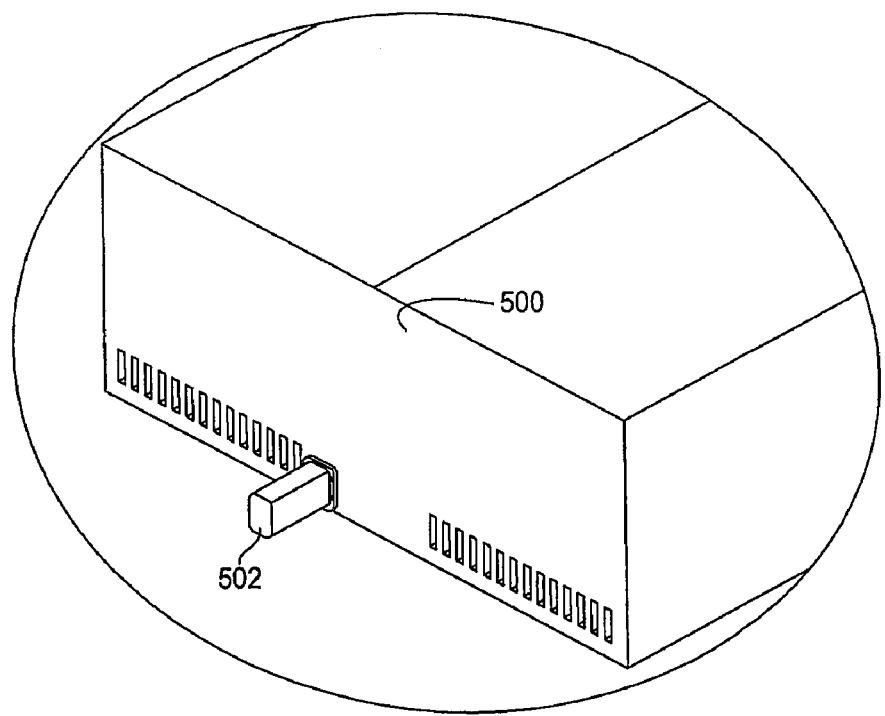
FIG. 5 is a detail of motor housing adaptable for use with the system embodiments shown in FIGS. 1-4.

A motor housing such as could be used in one of the embodiments of FIG. 1 is shown in FIG. 5. With reference to FIG. 5, a motor housing 502 on housing 500 is shown. The motor driving the shuttle could housed within this housing.

Figure 6:
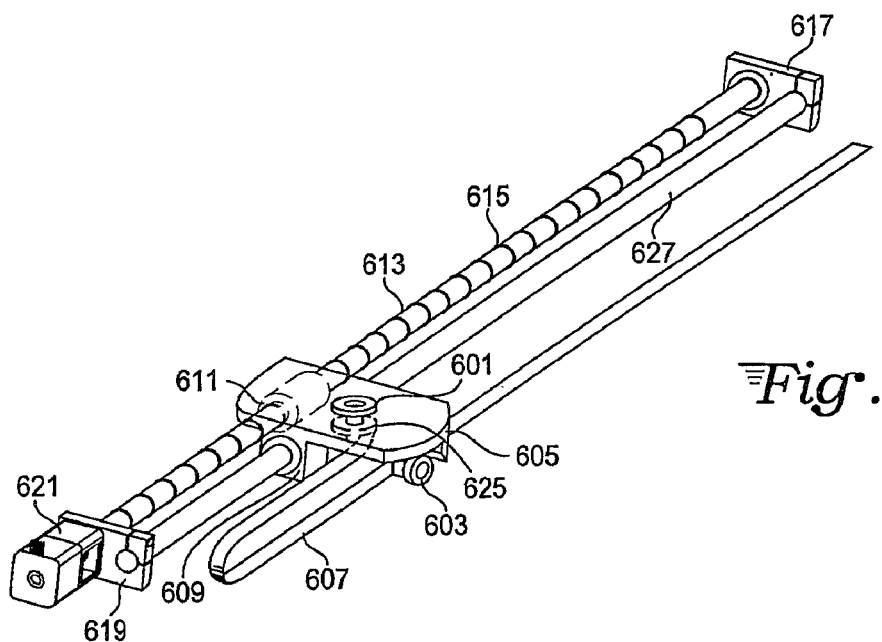
FIG. 6 is an embodiment of a shuttle track, motor and drive.

With reference to FIG. 6, a shuttle drive mechanism is shown. A top surface of shuttle platform 605 has a shuttle mount 601. This mount may be configured to allow rotation. The shuttle platform 605 is mounted on a wheel 603. The wheel 603 is configured to rest on a floor of the housing. A ribbon tether 607 allows a control signal to be sent to the platform for providing instructions to the shuttles on the platform. As shown in the earlier figures a front mount 619 and rear mount 617 allow attachment of a guide rod 627. Sliding on guide rod 627 is a slider 609 to which the shuttle platform 619 is mounted. Also attached to slider 609 is a ballscrew nut 611. Mounted on rear mount 617 and front mount 619 is rod 613 having threads 615. The ballscrew nut 611 is configured to be driven along rod 613 between threads 615 as motor 621 rotates rod 613. This use of a ballscrew drive configuration allows accurate and reliable positioning of the shuttle platform 605 and thus the shuttle. In one exemplary embodiment the drive mechanism allows travel along the distance of 750 millimeters at a speed of up to 500 millimeters per second. In this configuration disks could be moved from a disk rack to a bank of disk drives of two seconds.

Figure 7:
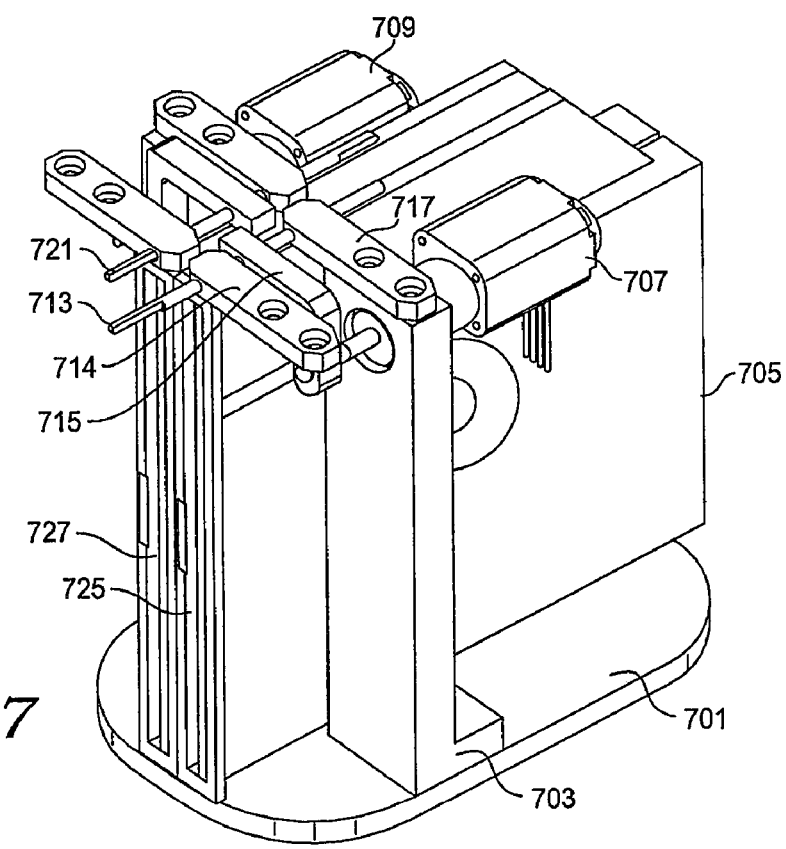
FIG. 7 is an embodiment of a shuttle.

One of the shuttle configurations is illustrated in the FIG. 7. As shown in this figure the shuttle includes a stage 701 onto which mount 703 is securely attached. Mounted to the stage or the mounts are readerless drives 705.

Attached to the top of the mount 703 is a first side solenoid 707. The second side solenoid 709 is similarly mounted. The solenoid actuator is attached to bridge 711 which then drives tip 713. A guide 715 and bridge guide 717 ensure linear motion of tip 713. In a similar manner tip 721 also is similarly configured. The actuators allow disks which have been ejected from the disk holder to be received into disk slots 725, 727.

Figure 8A:
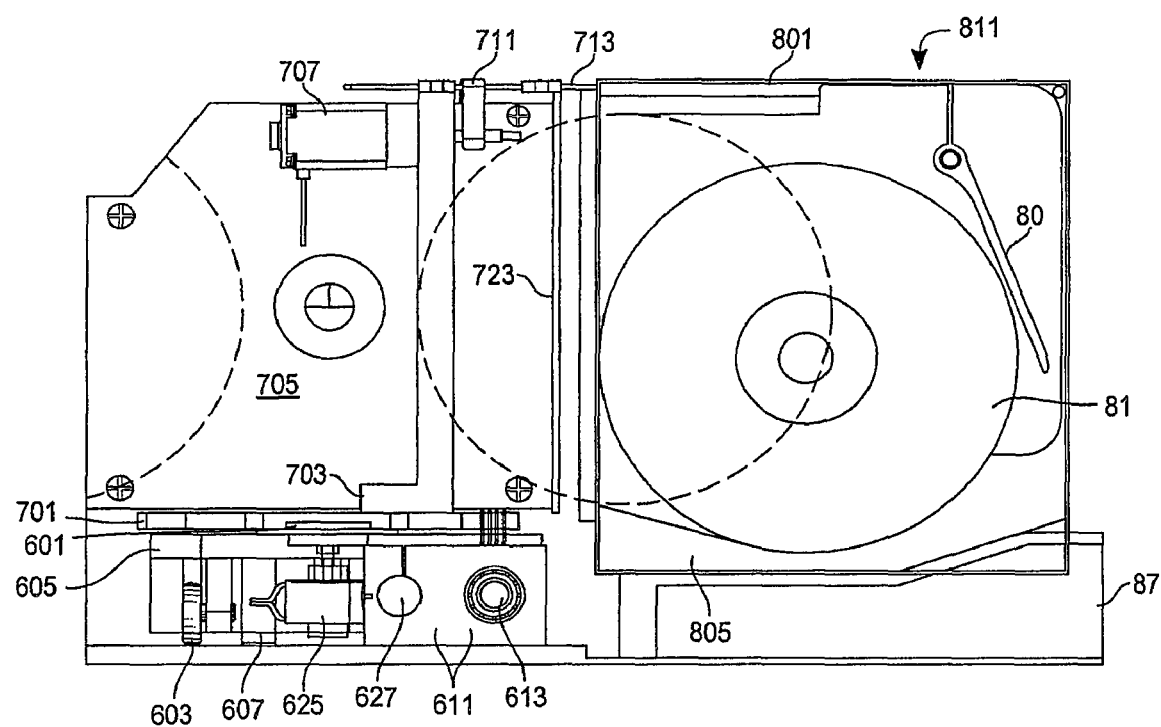
FIG. 8a is a side perspective view of a shuttle and disc cartridge embodiment.

The operation of this type of shuttle is shown in FIG. 8A. With reference to FIG. 8A, a side view of the shuttle and a disc cartridge is shown. As explained with respect to FIG. 6, the ball screw drive mechanism include a wheel 603 on which a shuttle platform 605 is mounted. The shuttle mount 601 is attached to stage 701 as explained with respect to FIG. 7. Shuttle mount 601 is mounted onto a rotational drive 625. Also mounted on shuttle platform is slider 611. Positioned through slider 611 is guide rod 627 and drive rod 613. Rotation of drive rod 613 allows precise movement of the shuttle platform 605. The tether 607 allows communication of directional signals to the shuttle, allowing both control of the disc loading process and rotation of the shuttle. Rotation of the shuttle allows discs to be loaded or unloaded from either side of the shuttle.

Mounted on stage 701 is the readerless drive 705 secured to the stage 701 by mount 703. Also attached to mount 703 is a solenoid 707 which allows a forward/backward driving of actuator tip 713 through guide 711.

When solenoid 707 receives a signal (transmitted through tether 607) to eject a disc, the solenoid is activated, driving actuation tip 713 forward into rod 801 on an optical disc cartridge 811. This drives arm 805 against the edge of optical disc 825, which moves the disc up incline 805 and into slot 723. The disc is moved into the shuttle, and can be transported to the read write drives. The edge contact of the disc is designed to have minimal wear on the optical disc surface.

Figure 8B:
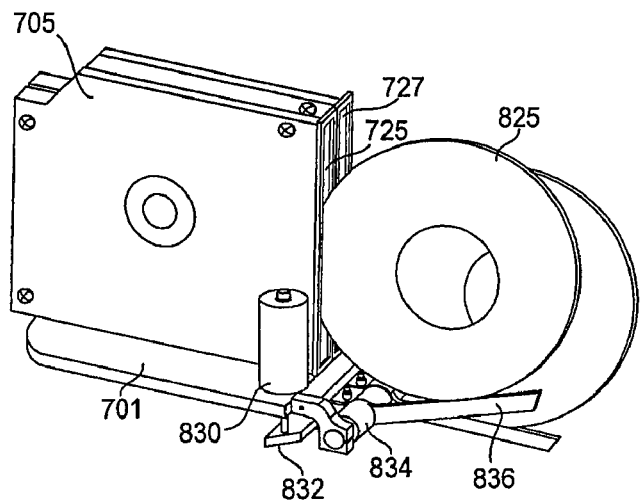
FIG. 8b is a side perspective view of an alternative disc shuttle and disc storage device embodiment.

An alternative shuttle configuration is shown in FIG. 8B. In this embodiment, the bank or rack of optical discs is mounted such that each disc 852 is positioned over a disc lift arm 836. The shuttle includes a stage 701, which, as detailed above, is mounted on a means to position the stage. When the stage is aligned with a selected disc, the disc slot 725 on the drive 705 (which may be a conventional disc drive with the read/write optical mechanism removed) is aligned with the location of an optical disc 825. A solenoid 830 on the shuttle stage 701 is activated, depressing pedal 832 which rotates roller 834. Attached to roller 834 is a disc lift arm 836. This arm lifts disc 835 a sufficient distance to allow the disc to be moved into slot 725 of drive 705. The shuttle includes two slots, 725 and 727 allowing two discs to be transferred by the device. It should be understood that this shuttle embodiment, as illustrated earlier, can be mounted on a rotating platform to allow access to discs on either side of the shuttle. Alternatively, the shuttle can be designed with a solenoid and disc slot on each of two opposing sides of the platform. This would allow discs to be loaded into each side of the shuttle without rotation of the shuttle platform. In another alternative, the disc transfer drive can be designed with a pass through configuration, in which discs could be loaded from either side of the shuttle. This would allow a pass through configuration in which a disc could be loaded from a first side, moved to a location of readers, and then unloaded into readers on either side of the shuttle. The discs could also be placed in the bank of readers on either side of the shuttle if desired.

Figure 8C:
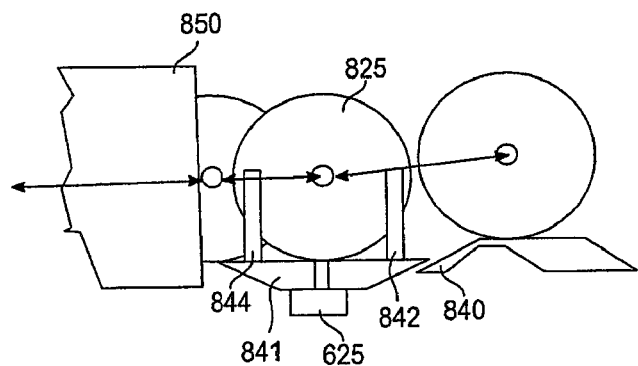
FIG. 8c is a side view another alternative shuttle embodiment and disc loading embodiment.

Another alternative disc transfer device is illustrated in FIG. 8O. In this embodiment, the shuttle 841 includes a first roller pair 842 and a second roller pair 844 mounted on shuttle 841. This may be mounted on a rotational drive 625, allowing discs to be "flipped" if the disc has optical media on both sides of the disc. The discs can be stored on a bank having a flexure release ramp 840. This may be a structure specific to each disc, and including a disc rolling channel (e.g., a groove in flexure release ramp 840) which can flex in response to pressure (as may be provided by a solenoid as in FIG. 8B, not shown in FIG. 8C). The bending of the ramp would allow the disc to be released, allowing the disc to roll onto the shuttle 841 and be moved by rotation of first roller pair 842 to between the first roller pair 842 and second roller pair 844. The disc would then be transported to a drive location 850 (shown in single view for ease of illustration), and the second and first roller pairs 844, 842 would be rotated, allowing the disc to be loaded onto the shuttle 841. The discs may or may not be aligned with the drives in the configuration of the disc library system.

Figure 8D:
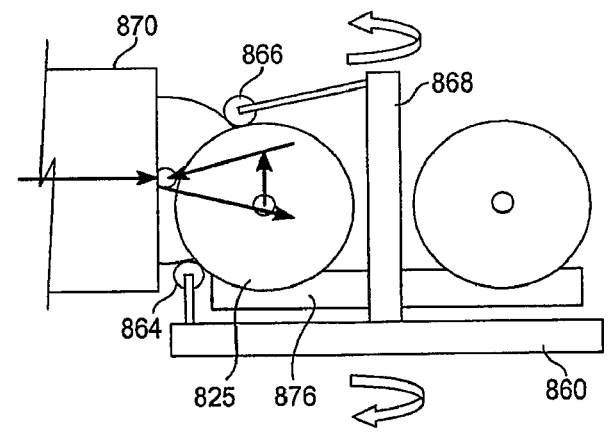
FIG. 8d is a side view of another alternative shuttle and disc loading embodiment.

With reference to FIG. 8D, another shuttle embodiment is shown. A disc 825 is held on a vacuum pad 862 on the shuttle. A first roller 864 engages the lower edge of the disc 825 and a second roller 866 mounted on a tower 868 can engage an upper edge of the disc 866. Each of the rollers may be designed with a groove track to minimize the out of line movement of the disc. The disc could then be rolled into a drive when the shuttle is positioned by a read/write drive and also rolled onto a disc rack or disc cartridge after a read/write operation is complete.

The various shuttle embodiments of FIGS. 8A-8D can be adapted to a number of different disc library systems shown in other figures.

The present system is designed to have a 4U form factor. The use of the configuration shown in FIG. 1, including the positioning of the power supply under the read/write drives, allows for this compact size. Such a size could hold up to 20 read/write drives and 500 Blu-ray discs. This would allow for 25,000 gigabytes of data to be managed in a single library.

A single shuttle could allow for movement of multiple discs, and movement of multiple discs in a single operation. In some of the embodiments, the shuttle is configured to load and unload from two sides of the shuttle. Thus a disc loaded into a first side of the shuttle can be loaded into a reader on the opposite side of the shuttle, received back into the shuttle following a read/write operation, and then loaded back into either bank of optical discs.

A single control board can control the movement of the shuttle or bank of discs. In addition, two data boards could allow input and output of data to the system, allowing receipt of instruction and transfer of data.

The modular design of the present system allow replacement of read/write drives, addition of discs, and exchange of power supplies or other components. The present system is configured to use available read/write drives, lowering the costs of the system.

We claim:

1. A system for data storage comprising:
   a housing;
   a plurality of memory disc storage racks positioned horizontally and parallel to each other within the housing, said racks configured to hold a plurality of memory discs substantially upright, each of memory discs being aligned horizontally and longitudinally within the rack;
   a track arranged between the storage racks;
   a bank of optical disc read/write drives positioned at one end of at least one of the racks, each of said disc read/write drives being arranged substantially upright and aligned horizontally;
   a power unit positioned under the bank of optical disc read/write drives, said power unit configured to provide power to said bank of optical disc read/write drives; and
   a shuttle mounted on said track, said shuttle configured to allow transfer of a plurality of discs from said plurality of disc storage racks to said read write drives through a space between the racks said space being wider than a disc diameter,
   wherein multiple discs may be transferred in a single transfer operation of the shuttle.

2. The system of claim 1, wherein said plurality of memory disc storage racks are configured to hold disc storage cartridges.

3. The system of claim 1, wherein the memory disc storage racks are positioned proximate to a first and second side with the housing, with the track positioned between the storage racks.

4. The system of claim 1, wherein the shuttle is a read/write drive mounted on a transportable stage, said read write drive not having an optical read/write component.

5. The system of claim 1, wherein the shuttle has a solenoid controlled actuator, said actuator configured to trigger a mechanism at said disc storage racks to expel a memory disc from said rack onto said shuttle.

6. The system of claim 1, wherein said shuttle is driven by a ball screw mechanism.

7. The system of claim 1, wherein said shuttle includes a mechanism to rotate the shuttle.

8. A system for data storage comprising:
   a housing;
   a plurality of memory disc storage racks positioned horizontally within the housing, said racks configured to hold a plurality of memory discs substantially upright, each of memory discs being aligned horizontally within the rack,
   a track spanning the storage racks;
   a bank of optical disc read/write drives positioned along at least one wall of the housing each of said disc read/write drives being arranged substantially upright and aligned horizontally; and
   a shuttle mounted on said track, said shuttle having a rotational function and a disc receiving structure on at least two sides of said shuttle, said shuttle configured to allow transfer of at least one optical media disc from at least one of said plurality of disc storage racks to said read write drives.

9. The system of claim 8, wherein said track spanning the storage racks includes a first track fixedly mounted on a housing floor and a second track mounted on the first track in a substantially orthogonal orientation such that said second track may be selectively moved along said first track, where said shuttle is mounted on said second track, wherein said shuttle is movable to optical disc racks positioned in a substantially orthogonal orientation.

10. The system of claim 8, wherein said shuttle includes a solenoid mounted on the shuttle allowing actuation of a disc moving mechanism proximate to a disc in said disc storage rack.

11. The system of claim 8, wherein said disc moving mechanism is in a disc storage cartridge.

12. The system of claim 8, wherein said shuttle is driven by a ball screw drive.

13. The system of claim 8, wherein said shuttle includes a mechanism to rotate a disc transfer mechanism on said shuttle.

14. A system for storage of optical media comprising:
   a housing;
   a plurality of optical media storage racks positioned horizontally within the housing, said racks configured to hold a plurality of optical discs substantially upright, each of memory discs being aligned horizontally within the rack;
   a plurality of banks of disc read/write drives positioned within said housing;
   a means for relatively moving the storage racks with respect to the banks of disc read write drives; and
   a means for transfer of media storage discs between said storage racks and the read/write drives.

15. The system of claim 14, where the means for relatively moving the storage racks with respect to the read/write drives includes mounting the storage racks to allow movement of the racks relative to stationary read/write drives.

16. The system of claim 1, wherein the shuttle include a disc container which hold the disc upright.

17. The system of claim 1, wherein the shuttle includes a disc ejection mechanism which is configured to push the disc out of the racks and to move the disc to the shuttle.

18. The system of claim 1, wherein the drives have a slot-in loading mechanism.

19. The system of claim 2, wherein the disc storage cartridge include a disc push out mechanism.

* * * * *